United States Patent
Gay et al.

(10) Patent No.: US 7,590,947 B1
(45) Date of Patent: Sep. 15, 2009

(54) INTELLIGENT AUTOMATIC WINDOW SIZING

(75) Inventors: Jonathan Gay, Mill Valley, CA (US); Giacomo Guilizzoni, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 841 days.

(21) Appl. No.: 10/856,701

(22) Filed: May 28, 2004

(51) Int. Cl.
*G06F 3/048* (2006.01)

(52) U.S. Cl. ........................ 715/800; 715/798

(58) Field of Classification Search ........... 715/800, 715/864, 815
See application file for complete search history.

(56) References Cited

U.S. PATENT DOCUMENTS

| | | | | |
|---|---|---|---|---|
| 5,751,283 | A * | 5/1998 | Smith ...................... | 715/798 |
| 6,178,432 | B1 * | 1/2001 | Cook et al. ............... | 715/201 |
| 6,857,102 | B1 * | 2/2005 | Bickmore et al. ........ | 715/501.1 |
| 7,222,306 | B2 * | 5/2007 | Kaasila et al. ............ | 715/801 |
| 7,521,675 | B2 * | 4/2009 | Kawasaki et al. ......... | 250/310 |
| 2003/0014445 | A1 * | 1/2003 | Formanek et al. ........ | 707/526 |
| 2004/0136456 | A1 * | 7/2004 | Ogden ..................... | 375/240.01 |
| 2006/0175548 | A1 * | 8/2006 | Kawasaki et al. ......... | 250/310 |

OTHER PUBLICATIONS

Microsoft Word 2000 (9.0.6926 SP-3). Microsoft Coorperation. Copyright 1998-2000.*
Microsoft Word 2000 (9.0.6926 SP-3). Microsoft Corperation. Copyright 1998-2000.*
Microsoft XP. Microsoft Corporation. Copyright 2001.*

* cited by examiner

*Primary Examiner*—Doug Hutton
*Assistant Examiner*—Soumya Dasgupta

(57) ABSTRACT

A system and method is described that attempts to increase the presentation of information in dynamic information objects arranged on a graphical user interface (GUI) designed for a specific display size and resolution. When such a GUI application window is displayed on a display size and resolution different from the designed size, the application obtains the projected dimension information for the GUI window to be displayed on the new display and re-sizes the constituent elements to maximize the presentation of information on the dynamic information objects.

23 Claims, 5 Drawing Sheets

INTELLIGENT AUTOMATIC WINDOW SIZING

TECHNICAL FIELD

Embodiments of the present invention are directed to the resizing of graphic user interfaces, and more particularly, to optimizing the size of interface components during window resizing.

BACKGROUND OF THE INVENTION

Most modern computer applications use a graphical user interface (GUI) as a basic element of their functionality. A typical GUI system has objects and/or text that are represented within one or more defined areas of the screen, often referred to as windows, and that are capable of displaying images, text, controls, animations, videos or any combination thereof. The constituent objects that comprise a GUI window may be separated into two general categories. The first category includes menu buttons, operation buttons, images, and other objects that typically convey the same information regardless of the size at which they are rendered. The size of these static information objects may effect how well their information is conveyed (buttons may be hard to read, for example, if they are made too small), but making these objects larger does not generally create an opportunity to increase the information conveyed. The second category includes objects, such as dialog boxes or text blocks, that may convey different amounts of information depending on their size. The size of these dynamic information objects does, therefore, effect the amount of information conveyed. For example, a dialog box that is twice as large, for example, may convey twice as many dialog lines.

When a typical GUI is displayed on a computer screen, two important and interconnected parameters of the resulting window are physical size and resolution. The window's physical size is the actual width and height of the rendered window. For example, an application window may measure three inches in height and five inches in width when rendered on the computer display. That physical size is rendered in a particular resolution which typically depends on the resolution of the computer display. In a typical 15 inch monitor running a Super Video Graphics Array (SVGA) resolution of 800 pixels by 600 pixels, a single pixel generally has a representative width of approximately 0.015 inches. Therefore, in order to display the application window that has a width of five inches, the computer display uses approximately 333 pixels.

Most display monitors use one of several different display resolutions. In monitors 15 inch and smaller, the display resolution may generally be VGA (640×480) or SVGA (800× 600). Monitors that are 17 inch and larger may generally have resolutions at Extended Graphics Array (XGA) (1024×768), Super XGA (SXGA) (1280×1024), or higher. However, modern display drivers may allow a 15 inch monitor to render a resolution of 1024×768 or higher. Therefore, the size of the monitor and its display resolution are not a static ratio. Because of the possibilities of having different display sizes coupled with different resolutions, application designers typically design and code applications to produce a GUI that is optimal for one of the standard display sizes and resolutions. For example, an application developer may design an application window to render at 10 inches in width and 10 inches in height on a 15 inch monitor operating at an 800×600 resolution. When rendered, the 10 inch width will be represented in approximately 666 pixels across a 15 inch, SVGA monitor.

It should be noted that, in practice, an application developer may design based on the whole number of pixels instead of the whole number of inches. For example, a designer may design a window or application interface to be 550 pixels in width and 400 pixels in height. That may produce a window that is 8.25 inches in a 15 inch, SVGA monitor.

Because there are other display sizes and resolutions, an application GUI that has been designed with an optimal size in mind may result in different sizes on different display monitors. For example, the 10 inch width of application window mentioned above may render as a 7.33 inch width on a 17 inch monitor operating at a resolution of 1024×768. The application is still rendered using 666 pixels; however, in the larger monitor with the higher resolution, the pixel width is smaller, thus, producing a smaller overall width size. Moreover, along with the overall decrease in the width of the rendered window, each of the constituent elements within the window are also scaled down according to the difference between the sizes of the pixels. The result may produce an application window and GUI that is more difficult to read on a larger monitor with a higher resolution. Conversely, in a smaller monitor with a lower resolution, the application window may render larger than the designed 10 inches; possibly exceeding the size limits of the monitor.

Some application designers have designed application GUIs to automatically scale the window size according to the monitor size and resolution. In larger monitors, these applications scale the resolution of the application interface up to accommodate the decrease in the pixel size. For example, the 666 pixel width of the designed 10 inch application window may be scaled up to approximately 909 pixels in a 17 inch monitor operating at 1024×768. The scaled application window would then be displayed at approximately 10 inches in width, just as in the original display size. While the window maintains the same physical size as the originally designed window, each of the constituent elements, both static and dynamic information elements, are also simply scaled larger. Thus, while the constituent elements may be maintained at a relative size, the buttons, text, or images may actually appear oversized on the larger display.

Conversely, in accommodating the smaller-sized, lower-resolution monitor, the application window and accompanying elements would be scaled smaller. These smaller displays could be a very small display, such as on a personal digital assistant (PDA). Moving a GUI to the smaller displays typically attempts to maintain the entire application window on the screen. Therefore, the application would typically scale the application window and each of its constituent elements to fit onto the smaller display size. The resulting application GUI would have a small application window with each constituent element, both static and dynamic elements, also scaled smaller. However, if the display size is too small, it may become very difficult, if not impossible, to read.

Window resizing that is based on the resolution of the various computer displays is quite different than window resizing that occurs within the same resolution. For as long as GUI interfaces have existed, there has been the ability for the user to selectively resize the window within the interface window to suit the desire and tastes of the user. One method that has been used in same-resolution window resizing, is to maintain the size and relationship of each element within the window. Therefore, if the display window is too small to show each of the elements, scroll bars are provided to move the display window to see the elements. In this method, each of the constituent elements are maintained at the same size and with the same relationship to each other. Other methods maintain some elements, but then adjust others to accommodate the movement or sizing of the window. Some methods, such as those used in interactive multimedia environments like MACROMEDIA INC.'s, MACROMEDIA FLASH™, maintain the size of the window's constituent elements, but adjust the whitespace between the elements. Still other methods may even combine these methods. However, each of these methods accommodates resizing of application windows and window elements in a single resolution.

BRIEF SUMMARY OF THE INVENTION

Various embodiments of the present invention refine a GUI window to the characteristics of the display apparatus by intelligently adjusting the size of different types of constituent objects to match those characteristics.

GUI application windows typical have constituent static and dynamic information objects arranged on its display canvas. Any particular GUI application window is generally designed for optimal display on a specific size and resolution of a display monitor. However, the application and its GUI application windows often are rendered on monitors of varying sizes and resolutions. As the size and resolution of the display rendering the GUI application window changes, the application analyzes the available space based on the size and resolution of the monitor and determines the optimal sizes for each constituent element based on whether the element is a static information object or a dynamic information object. Because static information objects do not typically present additional information when scaled larger, the application attempts to maintain the optimal sizes of the static information objects while increasing the sizes of the dynamic information objects in order to present additional information to the users. The applications configured according to the various embodiments of the present invention are able to leverage display information maintained by the host system as well as information maintained by the operating system on each of the application window's constituent elements in order to make its determinations of the window re-sizing.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
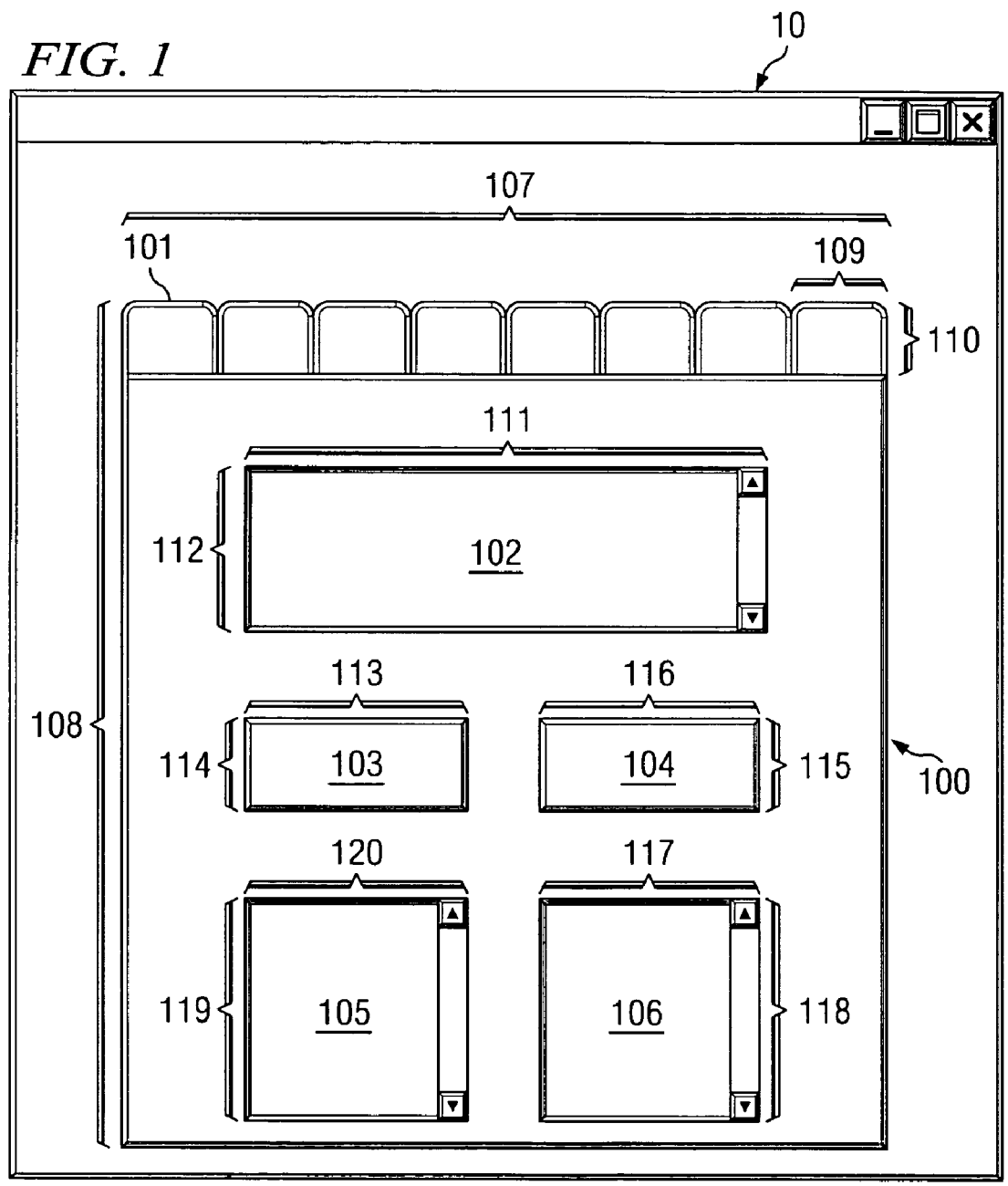
FIG. 1 is a diagram illustrating a GUI rendered by an application configured according to an embodiment of the present invention.

FIG. 1 is a diagram illustrating a GUI rendered by an application configured according to an embodiment of the present invention. Display 10 may be a typical 15 inch monitor configured at a resolution of 800×600. Application window 100 has been designed specifically for a standard 15 inch monitor with a resolution of 800×600. During the design process, it was determined that application window 100 would have an optimal size with a width of 107 and a height of 108. It should be noted that for purposes of the descriptions in the figures, the element numbers are used to describe the dimension. The numbers used do not reflect a physical size in any particular type of units, but merely direct attention to the element number in the figure.

Application window 100 includes menu buttons 101, text boxes 102 and 105, operation buttons 103 and 104, and image 106. During the design process each of menu buttons 101 were determined to have an optimal width of 109 and height of 110. Text box 102 was determined to have an optimal width of 111 and height of 112. Operation buttons 103 and 104 were determined to have an optimal width of 113 and 116, respectively, and height of 114 and 115, respectively. Text box 105 was determined to have an optimal width of 120 and height of 119, and image 106 was determined to have an optimal width of 117 and height of 118. In designing the GUI of application window 100, the optimal sizes are determined based on the ergonomics of users observing and interacting with the application GUI. Because it would be impractical to design a separate GUI for each possible display size and resolution, developers typically design towards the most common size and resolution.

Figure 2:
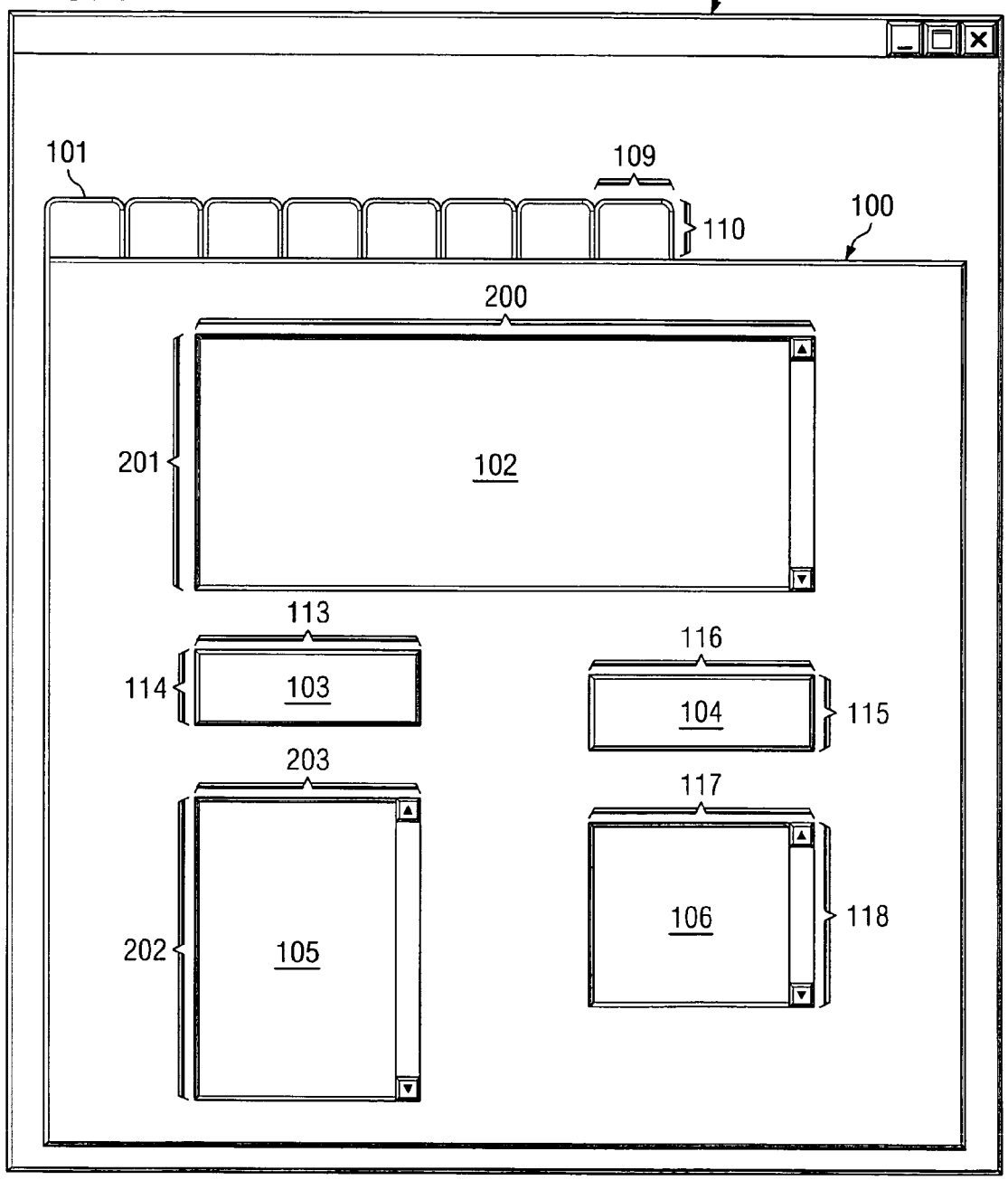
FIG. 2 is a diagram illustrating the GUI displayed in FIG. 1 displayed on a larger monitor by an application configured according to one embodiment of the present invention.

FIG. 2 is a diagram illustrating the GUI displayed in FIG. 1 displayed on a larger monitor by an application configured according to one embodiment of the present invention. Display 20 is a typical 17 inch monitor operating at a resolution of 1024×768. The mere fact that the resolution is larger would result in application window 100 being reduced in physical size compared with the rendering on display 10 (FIG. 1). However, display 20 is also much larger than display 10 (FIG. 1).

In operation of the application configured according to the present invention, the application rendering application window 100 attempts to adjust the GUI according to the size and resolution of display 20. The elements on application window 100 remain the same; however, their relative sizes are different. Display 20 is substantially larger than the optimal display size. Therefore, opportunity exists to modify the sizes application window 100's constituent elements to provide a user more information. Menu buttons 101 are static information objects that would not benefit from any expanse in size. In fact, expanding menu buttons 101 may distort their image or view as seen by the user. Therefore, menu buttons 101 remain at the optimal width 109 and height 110. Operation buttons 103 and 104 and image 106 are also static information objects. Therefore, the dimensions of these objects remain the same. Operation buttons 103 and 104 have a width of 113 and 116, respectively, and a height of 114 and 115, respectively. Image 106 keeps its dimensions of width 117 and height 118.

The dynamic information objects, text boxes 102 and 105, each display information to the user, which information may increase as the size of the objects increases. Each of text boxes 102 and 105 include scroll bars which would allow a user to scroll through the information that may not all be displayed within the confines of the objects. The application rendering application window 100 recognizes, by polling for well-known information maintained by the operating system, that text boxes 102 and 105 are text boxes and, thus, dynamic information objects. When the application finds such dynamic information objects, it determines the available whitespace based on the known dimensions of application window 100 along with the area covered by each of the static information objects, menu buttons 101, operation buttons 103 and 104, and image 106. Using this available whitespace surround text boxes 102 and 105, the application will re-size text boxes 102 and 105 to increase the space within the objects to display the information. When expanding the dynamic information objects, the application also rearranges operation button 103 to increase the available whitespace surrounding text box 105. Therefore, text box 102 is re-sized to a width of 200 and a height of 201, and text box 105 is re-sized to a width of 203 and a height of 202.

Figure 3:
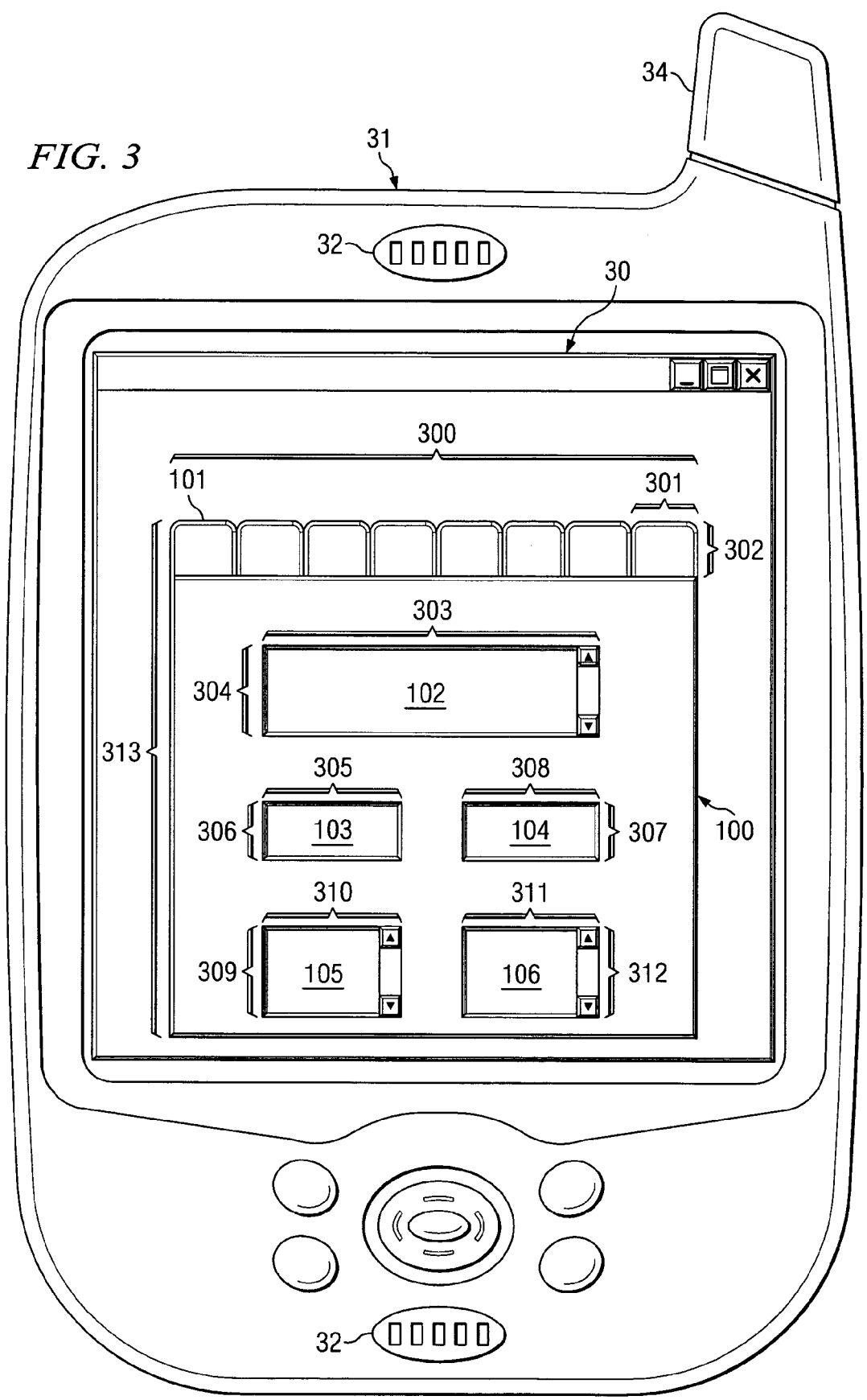
FIG. 3 is a diagram illustrating the GUI displayed in FIG. 1 displayed on a handheld device by an application configured according to one embodiment of the present invention.

FIG. 3 is a diagram illustrating the GUI displayed in FIG. 1 displayed on handheld device 31 by an application configured according to one embodiment of the present invention. Handheld device 31 may be a PDA, wireless phone, or a combination, as illustrated in FIG. 3 with microphone 32, speaker 33, and antenna 34. Handheld display 30 is substantially smaller than display 10 (FIG. 1). Handheld display 30 operates at a resolution of 240×320. When reducing the size of application window 100 to such a small display size, it may be impractical or even impossible to maintain some of the optimal sizes of any of the window objects, regardless of whether they are static or dynamic information objects. However, the application configured according the described embodiment continues to apply intelligence to its re-sizing of the window elements.

When reducing the static information objects, such as menu buttons 101, operation buttons 103 and 104, and image 106, the application applies a constant reducing scalar modified by any change in width 300 and height 313 of application window 100. Menu buttons 101 result in a width of 301 and a height of 302. Operation buttons 103 and 104 result in widths 305 and 308, respectively, and heights of 306 and 307, respectively. While image 106 results in width 311 and height 312. However, when reducing the dynamic information objects, such as text boxes 102 and 105, the application analyzes any available white space within application window 100 which may be used to make the dynamic information objects as large as possible. For example, text box 102 results in width 303 and height 304, which reflects that text box 102 takes up a larger percentage of application window 100 as compared to the relative percentage it covers on display 10 (FIG. 1). Similarly, text box 105 results in width 310 and height 309, which also reflects such a larger relative percentage coverage. Thus, the resulting display of application window 100 on handheld display 30 provides for an optimal size of the dynamic information objects, attempting to present more information to the user.

Another example operation of an application configured according to an additional or alternative embodiment of the present invention may be discussed referring again to FIG. 1. Many modern computer displays are capable of operating in many different resolutions depending on the display drivers used. Therefore, while display 10 remains a 15 monitor, for purposes of this example, the user changes the resolution from 800×600 to 1024×768. By changing to a larger resolution, the appearance of application window 100 would get smaller in physical size compared to the physical size when rendered on the smaller resolution. However, the application recognizes the change in resolution and attempts to maintain the optimal size of application window 100 and its constituent objects.

To maintain the designed optimal size on the same size monitor, application window 100 and each of its constituent objects are enlarged even though it is on the same size monitor. Therefore, each of the static information objects, menu buttons 101, operation buttons 103 and 104, and image 106, are scaled larger. Menu buttons 101 result in the same width 109 and height 110, operation buttons 103 and 104 result in the same widths 113 and 116, respectively, and the same heights 114 and 115, respectively, and image 106 results in the same width 117 and height 118. Similarly, the dynamic information objects, text boxes 102 and 105, are also scaled larger. Text box 102 results in the same width 111 and height 112, and text box 105 results in the same width 120 and height 119. Even though the opportunity exists for the dynamic information objects to be increased in size, the application attempts to maintain the designed optimal size of application window and each of its constituent elements.

It should be noted that in an additional and/or alternative embodiment of the present invention, the availability of more space within display 10 caused by a change in resolution may, in fact, prompt the application to increase the information presentation size of the dynamic information objects. Thus, the application may maintain the static objects, such as menu buttons 101, operation buttons 103 and 104, and image 106, at the smaller size caused by the larger resolution. At the same time, however, the application would scale the dynamic information objects, such as text boxes 102 and 105, larger in order to display more information to the user.

The above represent only a few examples of how embodiments of the present invention may optimize a GUI. Different applications or display apparatuses can have characteristics that may alter the choices made by an embodiment. For example, other applications may require maintaining either the physical size or the number of pixels used to render one or more of the constituent objects. It will be appreciated that optimizations can still be made by performing adjustments to other objects, and that any application used to optimize a GUI by balancing the optimal size of static information objects with a maximum size of dynamic information objects is an embodiment of the present invention.

When implemented via computer-executable instructions, various elements of embodiments of the present invention are in essence the software code defining the operations of such various elements. The executable instructions or software code may be obtained from a computer readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, computer readable media can include any medium that can store or transfer information.

Figure 4:
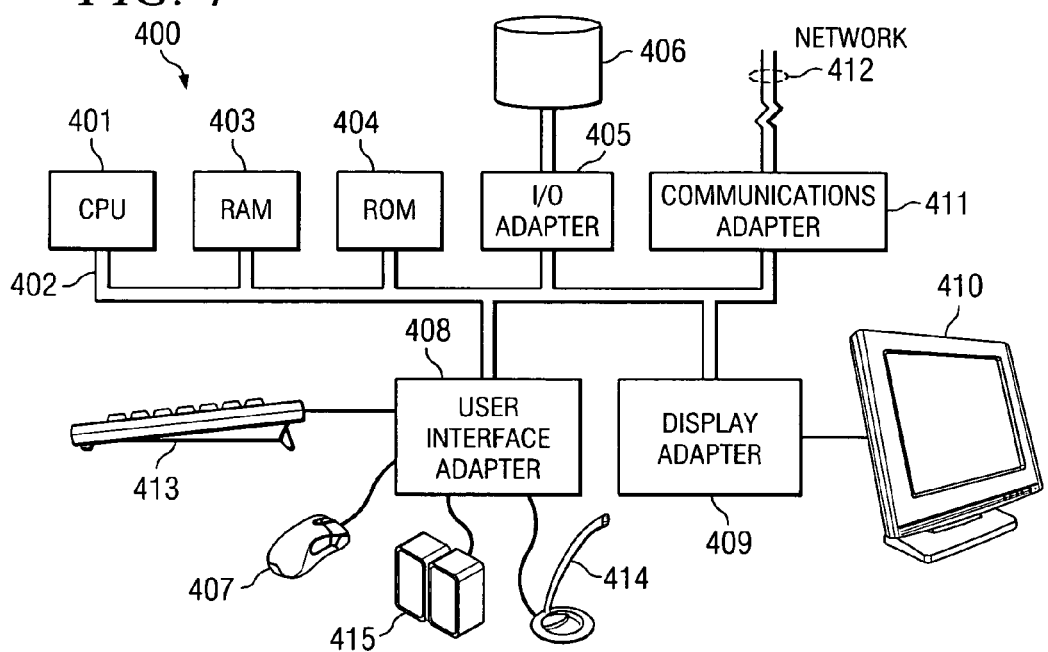
FIG. 4 illustrates an example computer system adapted according to embodiments of the present invention.

FIG. 4 illustrates an example computer system 400 adapted according to embodiments of the present invention. That is, computer system 400 comprises an example system on which embodiments of the present invention may be implemented. Central processing unit (CPU) 401 is coupled to system bus 402. CPU 401 may be any general purpose CPU. Suitable processors include without limitation INTEL's PENTIUM® 4 processor, as an example. However, the present invention is not restricted by the architecture of CPU 401 as long as CPU 401 supports the inventive operations as described herein. CPU 401 may execute the various logical instructions according to embodiments of the present invention. For example, CPU 401 may execute machine-level instructions and coding that produce the GUI windows of FIGS. 1-3.

Computer system 400 also preferably includes random access memory (RAM) 403, which may be SRAM, DRAM, SDRAM, or the like. Computer system 400 preferably includes read-only memory (ROM) 404 which may be PROM, EPROM, EEPROM, or the like. RAM 403 and ROM 404 hold user and system data and programs, as is well known in the art.

Computer system 400 also preferably includes input/output (I/O) adapter 405, communications adapter 411, user interface adapter 408, and display adapter 409. I/O adapter 405, user interface adapter 408, and/or display adapter 409 may, in certain embodiments, enable an application to interact with computer system 400 to determine the settings and/or characteristics of a display apparatus.

I/O adapter 405 preferably connects to storage device(s) 406, such as one or more of hard drive, compact disc (CD) drive, floppy disk drive, tape drive, etc. to computer system 400. The storage devices may be utilized when RAM 403 is insufficient for the memory requirements associated with storing data for user information. Communications adapter 411 is preferably adapted to couple computer system 400 to network 412. User interface adapter 408 couples user input devices, such as keyboard 413, pointing device 407, and microphone 414 and/or output devices, such as speaker(s) 415 to computer system 400. Display adapter 409 is driven by CPU 401 to control the display on display device 410.

It shall be appreciated that the present invention is not limited to the architecture of system 400. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Figure 5:
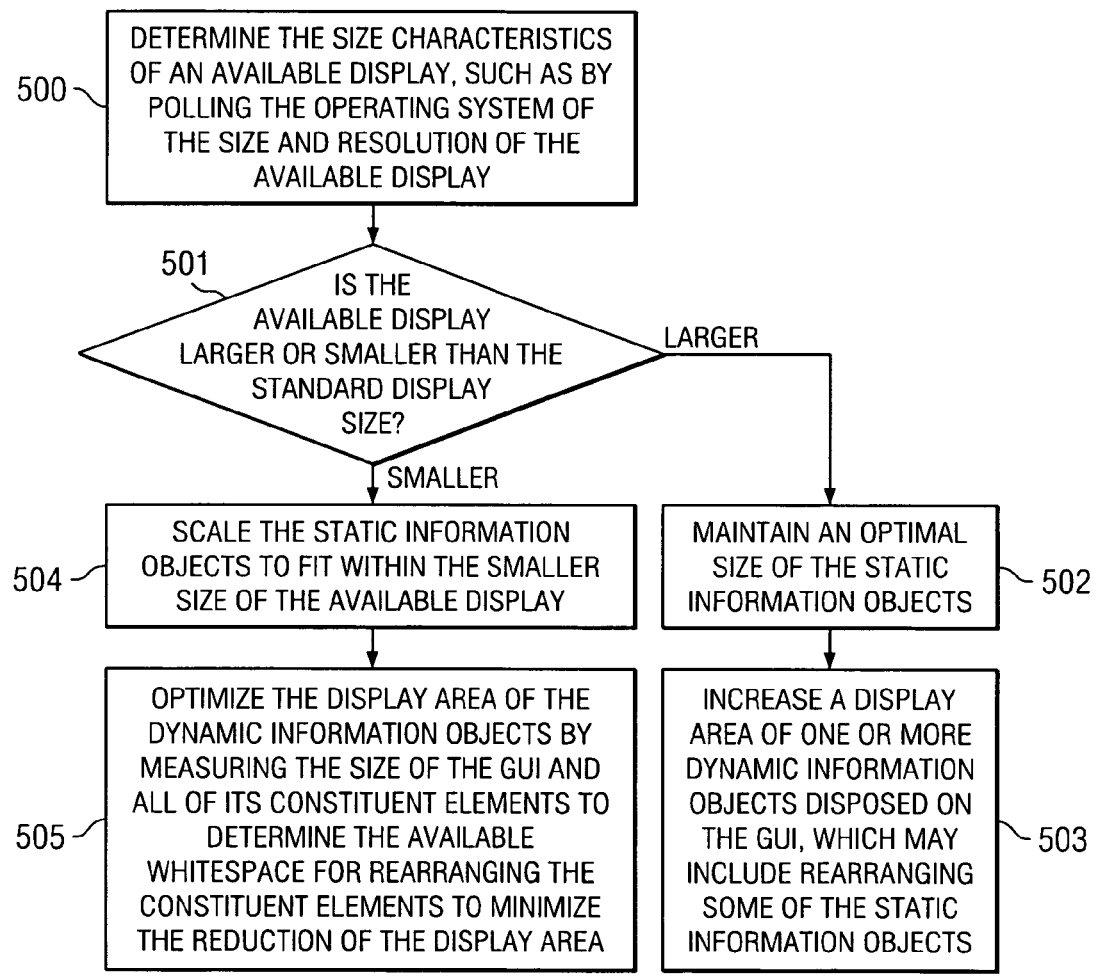
FIG. 5 is a flowchart illustrating example steps that may be executed in implementing one embodiment of the present invention for displaying a GUI designed for a standard display size on an available display.

FIG. 5 is a flowchart illustrating example steps that may be executed in implementing one embodiment of the present invention for displaying a GUI designed for a standard display size on an available display. In step 500, the size characteristics of an available display is determined. This may be accomplished by polling the operating system to determine the size and resolution of the available display. In step 501, a determination is made whether the available display is larger or smaller than the standard display that a GUI has been designed for. If the display is larger, the optimal size of the static information objects are maintained in step 502, while the display area on the dynamic information objects is increased in step 503. Increasing the size of the display area may include rearranging the static information objects within the GUI display.

If the available display is smaller, the static information objects are scaled smaller, in step 504, to fit within the smaller area. In step 505, the display area for the dynamic information objects is optimized to minimize the reduction in size of the object. Optimization may include calculating the area of the GUI, calculating the area covered by the constituent elements, determining the available whitespace within the GUI and then using that calculation to minimize the reduction of the display area, which may include moving the static display objects within the GUI.

Figure 6:
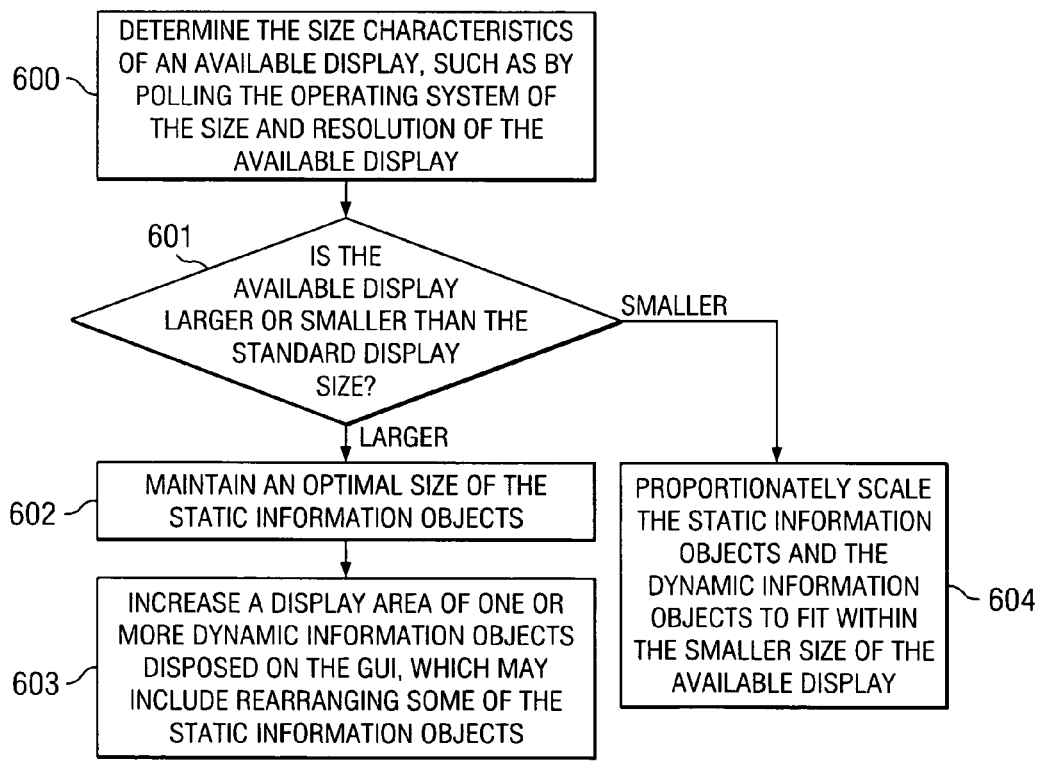
FIG. 6 is a flowchart illustrating example steps that may be executed in implementing an additional embodiment of the present invention for displaying a GUI designed for a standard display size on an available display.

FIG. 6 is a flowchart illustrating example steps that may be executed in implementing an additional embodiment of the present invention for displaying a GUI designed for a standard display size on an available display. In step 600, the size characteristics of an available display is determined. This may be accomplished by polling the operating system to determine the size and resolution of the available display. In step 601, a determination is made whether the available display is larger or smaller than the standard display that a GUI has been designed for. If the display is larger, the optimal size of the static information objects are maintained in step 602, while the display area on the dynamic information objects is increased in step 603. Increasing the size of the display area may include rearranging the static information objects within the GUI display.

The difference between the embodiment described here and the embodiment of FIG. 5 is in the function when the available display is smaller. If the available display is smaller than the standard display size, both the static information objects and the dynamic information objects will be proportionately scaled smaller, in step 604. to fit within the smaller size of the GUI window.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for displaying a graphical user interface (GUI) designed for a standard size and a standard resolution of a standard display, said method comprising:

determining at least a size and a resolution of an available display; and responsive to said size and said resolution of said available display being larger than said standard size and a standard resolution of said standard display, maintaining an optimal size of one or more static information objects disposed on said GUI and increasing a display area of one or more dynamic information objects disposed on said GUI, wherein said optimal size relates to a size observable by a user when interacting with said GUI on said standard display.

2. The method of claim 1 further comprising:
responsive to said size and said resolution of said available display being smaller than said standard size and a standard resolution of said standard display, scaling said one or more static information objects to fit within a smaller size of said available display and optimizing said display area of said one or more dynamic information objects.

3. The method of claim 2 wherein said optimizing further comprises:
calculating an area of said GUI;
calculating an object area of said one or more static information objects;
determining available whitespace within said GUI; and
rearranging said one or more static information objects and said dynamic information objects to minimize reduction of said display area.

4. The method of claim 1 further comprising:
responsive to said size and said resolution of said available display being smaller than said standard size and a standard resolution of said standard display, proportionately scaling each of said one or more static information objects and said one or more dynamic information objects to fit within said size and said resolution of said available display.

5. The method of claim 1 further comprising:
rearranging said one or more static information objects within said GUI to accommodate said increased display area of said one or more dynamic information objects.

6. The method of claim 1 wherein said determining comprises:
polling an operating system for said size and said resolution of said available display.

7. A system for displaying a graphical user interface (GUI) designed for a standard size and a standard resolution of a standard display, said system comprising:
means for analyzing a size and a resolution of a display monitor; and
means, responsive to said size and said resolution of said display monitor being larger than said standard size and a standard resolution of said standard display, for rendering one or more static information objects disposed on said GUI at an optimal size, wherein said optimal size relates to a size observable by a user when interacting with said GUI on said standard display, and means for expanding a presentation area of one or more dynamic information objects disposed on said GUI.

8. The system of claim 7 further comprising:
means, responsive to said size and said resolution of said display monitor being smaller than said standard size and a standard resolution of said standard display, for reducing said one or more static information objects to fit within said display monitor and means for optimizing said display area of said one or more dynamic information objects.

9. The system of claim 8 wherein said means for optimizing comprises:
means for calculating an area of said GUI;
means for calculating an object area of said one or more static information objects;
means for determining available whitespace within said GUI; and
means for rearranging said one or more static information objects and said dynamic information objects to minimize reduction of said presentation area.

10. The system of claim 7 further comprising:
responsive to said size and said resolution of said available display being smaller than said standard size and a standard resolution of said standard display, proportionately reducing each of said one or more static information objects and said one or more dynamic information objects to fit within said size and said resolution of said available display.

11. The system of claim 7 further comprising:
means for rearranging said one or more static information objects within said GUI to accommodate said increased display area of said one or more dynamic information objects.

12. The system of claim 7 wherein said means for analyzing comprises:
means for polling an operating system for said size and said resolution of said standard display.

13. A computer program product having a computer readable medium with computer program logic recorded thereon for displaying a graphical user interface (GUI) designed for a certain size and a certain resolution of a certain displays said computer program product comprising:
code for obtaining at least a size and a resolution of a target display;
code for comparing said certain size and said certain resolution of said certain display with said size and said resolution of said dimension; and
code for rendering one or more static information objects disposed on said GUI to an optimal size and code for expanding an information area of one or more dynamic information objects disposed on said GUI, wherein said optimal size relates to a size observable by a user when interacting with said GUI on said standard display, said code for rendering and code for expanding executable when said size and said resolution exceeds said certain size and said certain resolution of said certain display.

14. The computer program product of claim 13 further comprising:
code for reducing a size of said one or more static information objects to fit within said target display and code for minimizing reduction of said information area of said one or more dynamic information objects, said code for reducing and said code for minimizing reduction executable responsive to said certain size and said certain resolution of said certain display exceeding said size and said resolution.

15. The computer program product of claim 14 wherein said code for minimizing reduction further comprises:
code for calculating an area of said GUI;
code for calculating an object area of said one or more static information objects;
code for determining available whitespace within said GUI; and
code for rearranging said one or more static information objects and said dynamic information objects to minimize reduction of said information area.

16. The computer program product of claim 13 further comprising:
code, responsive to said size and said resolution being smaller than said certain size and said certain resolution of said certain display, for proportionately scaling each of said one or more static information objects and said one or more dynamic information objects to fit within said size and said resolution of said target display.

17. The computer program product of claim 13 further comprising:
code for moving said one or more static information objects within said GUI to accommodate said increased display area of said one or more dynamic information objects.

18. The computer program product of claim 13 wherein said determining comprises:
   code for polling an operating system for said size and said resolution of said target display.

19. A method for resizing a graphical user interface (GUI) designed for a standard size and a standard resolution of a standard monitor, said method comprising:
   determining a size and a resolution of an available monitor;
   comparing said size and said resolution with said standard size and said standard resolution of said standard monitor; and
   responsive to said size and said resolution being larger than said standard size and said standard resolution of said standard monitor, expanding a viewing area for each of one or more dynamic information objects disposed within said GUI, and maintaining an object size of each of one or more static information objects disposed within said GUI.

20. The method of claim 19 further comprising:
   responsive to said size and said resolution being smaller than said standard size and said standard resolution of said standard monitor, proportionately scaling said one or more dynamic information objects and said one or more static information objects to fit within said smaller available monitor.

21. The method of claim 19 wherein said determining comprises:
   polling an operating system for said size and said resolution of said available monitor.

22. The method of claim 19 wherein said expanding comprises:
   calculating an area of said GUI to be displayed on said available monitor;
   calculating an object area of said one or more static information objects;
   determining an amount of whitespace within said GUI; and
   resizing said one or more dynamic information objects according to surrounding portions of said amount of whitespace.

23. The method of claim 22 wherein said expanding further comprises:
   moving said one or more static information objects within said GUI to increase said surround portions.

\* \* \* \* \*

UNITED STATES PATENT AND TRADEMARK OFFICE
CERTIFICATE OF CORRECTION

PATENT NO. : 7,590,947 B1  Page 1 of 1
APPLICATION NO. : 10/856701
DATED : September 15, 2009
INVENTOR(S) : Gay et al.

It is certified that error appears in the above-identified patent and that said Letters Patent is hereby corrected as shown below:

On the cover page,

Item [*] Notice:  Subject to any disclaimer, the term of this patent is extended or adjusted under 35 U.S.C. 154(b) by 841 days.

Delete the phrase "by 841 days" and insert -- by 1338 days --

Signed and Sealed this

Tenth Day of August, 2010

David J. Kappos
*Director of the United States Patent and Trademark Office*